April 11, 1950            D. G. C. HARE            2,503,730
AMPLIFYING AND QUENCHING CIRCUITS
FOR RADIATION DETECTORS
Filed March 8, 1945
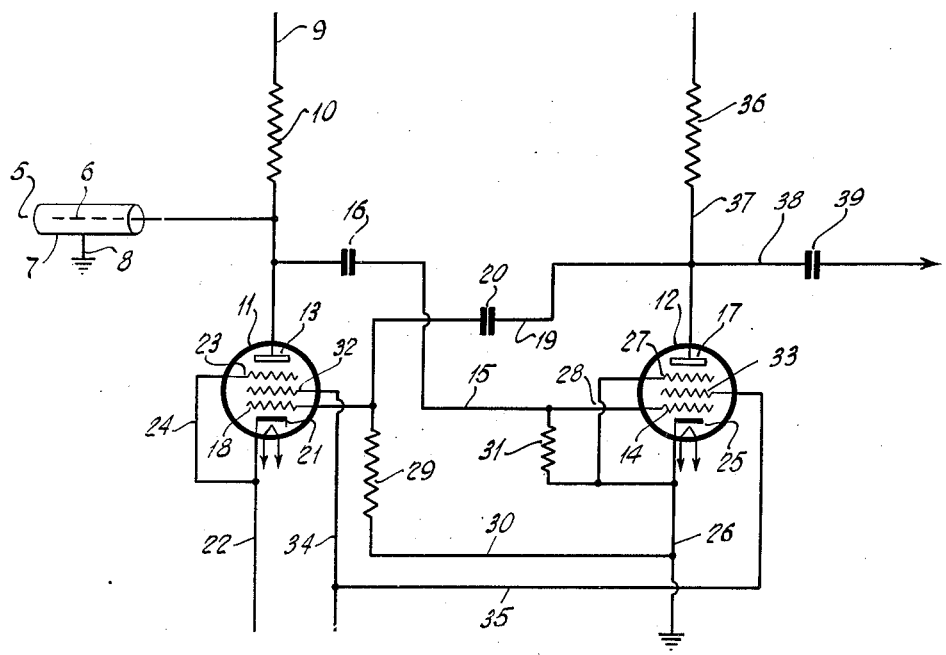
INVENTOR.
DONALD G. C. HARE.
BY
ATTORNEY.

Patented Apr. 11, 1950

2,503,730

UNITED STATES PATENT OFFICE 2,503,730

AMPLIFYING AND QUENCHING CIRCUITS FOR RADIATION DETECTORS

Donald G. C. Hare, Roslyn, N. Y., assignor to Texaco Development Corporation, New York, N. Y., a corporation of Delaware Application March 8, 1945, Serial No. 581,647

3 Claims. (Cl. 250—83.6)

The present invention relates to improvements in circuits for the amplification and quenching of radiation detectors of the counter or pulse-producing type, such as Geiger-Muller counters and high efficiency counters such as those of my U. S. Letters Patent No. 2,397,071, granted March 19, 1946, and the U. S. Letters Patent of myself and Gerhard Herzog No. 2,397,073, also granted March 19, 1946.

The circuit of the present invention is particularly intended for use in connection with radiation detectors employed in the radioactive logging of oil wells, bore-holes, and the like, in which, in many cases, the radiation passes through a casing as well as the housing of the instrument employed, and in which the intensity of radiation may vary from very weak to fairly strong. In the operation of the counter type of radiation detectors, the pulse rate is one indication of the intensity of radiation. However, as the pulse rate increases, in the operation of such detectors with the quenching and amplifying circuits hitherto used, there is a tendency for the amplitude of the pulses to decrease. It is, therefore, advantageous that the counter should be able to effectively operate for rapid as well as slower pulse rates and to secure pulses of approximately equal amplitude irrespective of the rate of pulses.

In accordance with the present invention I have been able to secure effective counting of the pulses, even at high rates, and also to secure substantially equalized pulses, which may then be further amplified, or may be directly transmitted from the instrument containing a detector to recording and measuring equipment, which, in well-logging, would be at surface.

The circuit of the present invention is illustrated digrammatically in the single figure of the drawing.

In the drawing, numeral 5 designates a detector of the counter type having a suitable gas filling, such as a Geiger-Muller counter or a detector of the high efficiency type, shown in the patents hereinbefore referred to. The detector is shown schematically by a conventional representation of an anode 6 and cathode 7. Such detectors or counters require a high voltage for operation, which may be in the order of 800 to 1200 volts, for example.

The cathode 7 of detector 5 is connected to ground or, for convenience, may be connected to the casing of the logging instrument, through conductor 8. The high voltage for operation of the detector is impressed upon the anode 6 through a conductor 9 and a resistor 10. It is to be understood that where ground connections are referred to herein, such connections may be to the housing of the instrument in which the equipment is contained.

The circuit for impressing the operating voltage upon and for quenching and amplifying the pulses from the counter or detector comprises the electronic tubes 11 and 12, which are interconnected in a manner similar to a multi-vibrator circuit. Tubes 11 and 12 are illustrated as pentodes, although, as is readily apparent, triodes or other suitable forms of tubes may be employed. The plate 13 of the tube 11 is coupled to the control grid 14 of tube 12 through a conductor 15, in which a condenser 16 is interposed; and the plate 17 of tube 12 is coupled to the control grid 18 of tube 11 through connector 19 in which the condenser 20 is interposed.

The cathode 21 of the tube 11, is maintained at a positive voltage somewhat above ground, this voltage being impressed upon the cathode from a suitable voltage source through the conductor 22. The suppressor grid 23 of the tube 11 has impressed upon it the same positive potential as that upon the cathode 21, the suppressor grid and cathode being connected by the conductor 24.

The cathode 25 of tube 12 is grounded through conductor 26 and the suppressor grid 27 is also grounded through the conductors 28 and 26.

The control grid 18 of tube 11 is biased, preferably to about or beyond cut-off, by grounding it through the resistor 29 and conductor 30. The control grid 14 of the tube 12 is connected through the grid resistor 31 to the cathode 25 and this tube is then at zero bias. The screen grids 32 and 33 of tubes 11 and 12, respectively, have impressed upon them a constant positive potential somewhat higher than that impressed upon the cathode 21 of tube 11. This is effected by connecting them through conductors 34 and 35, respectively, to a suitable source of direct current voltage.

To supply plate current for the tube 12, a positive potential which, in general, is not as high as that impressed upon the detector anode 6 and the plate 13 of tube 11, is impressed upon the plate 17 of tube 12 through a resistor 36 and a conductor 37. Thus, by way of illustration, in a particular case in which a voltage of about 1000 volts was impressed upon the anode of the detector 5 and upon the plate 13 of tube 11, a positive voltage of about 200 volts was impressed upon the plate 17 of tube 12; the positive voltage impressed upon the cathode 21 of tube 11 was 22 volts and that impressed upon the screen grids 32 and 33 of the tubes 11 and 12 was 45 volts. These voltages are, of course, voltages above the ground potential or potential of the casing containing the equipment.

The output pulses from the tube 12 may be taken off from the plate 17 through the conductor 38 and condenser 39 and may be further amplified for transmission to the recording or measuring devices (not shown), or may be directly transmitted thereto. When the equipment is used in connection with a well-logging instrument, the output signals from the circuit are transmitted through a suitable conductor in the cable by which the instrument is suspended.

Tube 12 is preferably zero-biased or has only slight negative bias and is normally conducting when there is no discharge through the detector 5. At the same time the tube 11 is non-conducting and the multivibrator system is in one of its stable states. When a discharge occurs in the detector 5 as a result of radiation, either natural or induced, to which the detector is subjected, the voltage on the plate of tube 11 is lowered and at the same time a negative pulse is transmitted to the control grid 14 of tube 12. This produces a positive pulse at the plate 17 of the tube 12, which in turn reacts through the multivibrator couplings to further increase the flow of current through tube 11. The voltage at the plate 13 of tube 11 and on the anode 6 of the detector 5 is reduced due to the flow of the current through the resistor 10.

The process continues until the system reaches its second stable state, at which time the voltage on the anode of the detector is sufficiently low to cause quenching of the detector, whereupon the grid of tube 12 recovers to its zero-bias and thereby the plate voltages on tube 12 and 11 are restored to their original values, and the detector to its operating condition.

The operation of the circuit of the present invention results in the production of amplified pulses which are equalized both as to amplitude and width as a result of the discharges within the detector, irrespective of the counting rate over a wide range.

Using the circuit of the present invention, rapid quenching of the counter or detector is secured. The cathode of the detector being grounded, its capacity does not affect the circuit, and it is not necessary that it be insulated from the housing of the instrument. The resistance of the resistor 10 is preferably made relatively low; the recovery of the detector after discharge is rapid, and the detector operates effectively at high counting rates, as when it is in a region of more intense radioactivity. The circuit results in the delivery of sharply defined pulses, well equalized both as to amplitude and width, even when the initial pulses derived from the detector are small.

As illustrative of an embodiment of the invention in which a positive direct current voltage of 1000 to 1100 volts was impressed upon the anode of the detector 5 and the plate of tube 11, both tubes 11 and 12 were of the 7C7 type and the resistance of resistor 10 was 0.5 megohms. The operating voltage impressed on plate 17 of tube 12 was from a source of a positive voltage of 200 volts, and the resistance of resistor 36 was in the range of 50,000 to 100,000 ohms. The capacity of condenser 16 was 50 $\mu\mu$f. and that of condenser 20 was 0.0001 $\mu$f. A positive direct current voltage of 22 volts was applied to the cathode 21 of tube 11 and the voltage applied to the screen grid of both tubes was 45 volts.

As is readily apparent, the positive potentials required for the various potentials of these circuits may be taken from a single source, through suitable voltage dividers or potentiometers, or the like, if desired, or from a plurality of sources. The desired bias on the control grid of tube 11 may be secured in other ways than as illustrated herein, as, for example, by means of a bias battery, in which case it is not necessary to impress a positive potential on the cathode of tube 11. If desired, negative pulses can be taken from the output tube 11 by suitable coupling to its plate or from the cathode 25 of tube 12 by inserting a cathode load resistor.

The pulses derived from the circuit illustrated may be transmitted to any suitable measuring or recording device, preferably after further amplification.

Although the present invention has been described in connection with the illustration of a specific embodiment thereof, it is to be understood that the invention is not to be regarded as limited to the details thereof, except in so far as included in the accompanying claims.

What I claim is:

1. In combination, a radiation detector of the counter type, an electronic discharge tube having its plate connected to the anode of the detector, means for impressing a high direct current voltage for the operation of the detector on the anode of the detector and the plate of said tube, a second electronic discharge tube, said first and second tubes being interconnected in multivibrator relationship, means to impress an operating direct current voltage on the plate of the second tube, said operating voltage being independent of that impressed on the anode of the detector and the plate of the first tube, whereby, on discharging the detector, a negative pulse is supplied to the control grid of the second tube and a positive pulse from the plate of the latter to the control grid of the first tube through the multivibrator connections to cause said first tube to pass current and lower the potential on the detector anode, causing the detector to quench, and means to take a pulse from an electrode of one of said tubes.

2. The combination of claim 1, wherein means are provided for grounding the cathode of the detector.

3. The combination of claim 1, wherein means are provided to impress a substantially higher voltage upon the plate of the first of said tubes and upon the detector anode than upon the plate of the second of said tubes.

DONALD G. C. HARE.

REFERENCES CITED

The following references are of record in the file of this patent:

UNITED STATES PATENTS

| Number | Name | Date |
|---|---|---|
| 2,340,967 | Langer | Feb. 8, 1944 |
| 2,383,478 | Friedman et al. | Aug. 28, 1945 |

OTHER REFERENCES

"Review of Scientific Instruments," vol. 7, May 1936, pp. 207 to 210.